United States Patent
Yu et al.

(10) Patent No.: US 9,363,624 B2
(45) Date of Patent: Jun. 7, 2016

(54) ELECTRONIC APPARATUS WITH A TOUCH PANEL AND DATA TRANSMISSION METHOD FOR A BODY AREA NETWORK

(71) Applicants: BEIJING LENOVO SOFTWARE LTD., Beijing (CN); LENOVO (BEIJING) CO., LTD., Beijing (CN)

(72) Inventors: Haifeng Yu, Beijing (CN); Na Ju, Beijing (CN); Ke Shang, Beijing (CN)

(73) Assignees: BEIJING LENOVO SOFTWARE LTD., Beijing (CN); LENOVO (BEIJING) CO., LTD., Beijing (CN)

( * ) Notice: Subject to any disclaimer, the term of this patent is extended or adjusted under 35 U.S.C. 154(b) by 104 days.

(21) Appl. No.: 14/106,480

(22) Filed: Dec. 13, 2013

(65) Prior Publication Data

US 2014/0170981 A1 Jun. 19, 2014

(30) Foreign Application Priority Data

Dec. 14, 2012 (CN) .......................... 2012 1 0546051
Dec. 28, 2012 (CN) .......................... 2012 1 0587077

(51) Int. Cl.
| | |
|---|---|
| H04W 4/00 | (2009.01) |
| G06F 3/041 | (2006.01) |
| G06F 3/044 | (2006.01) |
| H01Q 1/22 | (2006.01) |
| H01Q 1/44 | (2006.01) |

(52) U.S. Cl.
CPC ............. *H04W 4/005* (2013.01); *G06F 3/044* (2013.01); *G06F 3/0416* (2013.01); *H01Q 1/2291* (2013.01); *H01Q 1/44* (2013.01)

(58) Field of Classification Search
CPC ........ H01Q 1/2291; H01Q 1/44; G06F 3/044; G06F 3/0416
See application file for complete search history.

(56) References Cited

U.S. PATENT DOCUMENTS

| | | | | |
|---|---|---|---|---|
| 2009/0316186 | A1* | 12/2009 | Higashi et al. | .......... G06F 21/35 358/1.15 |
| 2012/0013555 | A1* | 1/2012 | Maeda et al. | .................. 345/173 |
| 2012/0244837 | A1* | 9/2012 | Fyke et al. | ..................... 455/411 |

FOREIGN PATENT DOCUMENTS

CN  102239655  11/2011

OTHER PUBLICATIONS

Chinese Patent Application No. 201210546051.5, Chinese Patent Office, First Office Action mailed on Mar. 24, 2016; 6 pages.
English Text Translation of First Office Action for Chinese Patent Application No. 201210546051.5, Chinese Patent Office, First Office Action mailed on Mar. 24, 2016; 3 pages.

(Continued)

*Primary Examiner* — Liliana Cerullo
(74) *Attorney, Agent, or Firm* — Dentons US LLP

(57) ABSTRACT

The present invention discloses an electronic apparatus and a data transmission method. The electronic apparatus includes a touch control communication unit for executing touch control input or communication data transmission, a touch control driving unit for providing a driving signal to and receiving a touch control signal from the touch control communication unit, a communication driving unit for providing communication data to be transmitted to and receiving it from the touch control communication unit, and a control unit for controlling the touch control communication unit to be in a first working status in which the touch control communication unit is electrically connected to the touch control driving unit and executes touch control input or a second working status in which the touch control communication unit is electrically connected to the communication driving unit and executes communication data transmission according to predetermined conditions.

12 Claims, 6 Drawing Sheets

(56) References Cited

OTHER PUBLICATIONS

English Text Translation of Chinese Published Application No. CN102239655 (A), published on Nov. 9, 2011, Koninkl Philips Electronics NV; 17 pages.

Chinese Patent Application No. 201210587077.4, Chinese Patent Office, First Office Action mailed on Apr. 18, 2016; 6 pages.

English Text Translation of First Office Action for Chinese Patent Application No. 201210587077.4, Chinese Patent Office, First Office Action mailed on Apr. 18, 2016; 4 pages.

* cited by examiner

ELECTRONIC APPARATUS WITH A TOUCH PANEL AND DATA TRANSMISSION METHOD FOR A BODY AREA NETWORK

CROSS REFERENCE TO RELATED APPLICATIONS

This application claims the benefit under 35 U.S.C. §119(a) of Chinese Patent Application No. 201210587077.4, filed on Dec. 28, 2012, and Chinese Patent Application No. 201210546051.5, filed on Dec. 14, 2012, the entire disclosures of which are incorporated by reference herein in their entireties.

BACKGROUND

The present invention relates to the field of electronic apparatus, more particularly, to an electronic apparatus and a data transmission method thereof.

Lately, 802.15 workgroup of IEEE of America pushing short distance wireless communication standardization has approved a standard of "IEEE 802.15.6" of short distance wireless networks composed by various sensors and devices configured in periphery of the human body. This is a communication mode referred to as "BAN (body area network)". Body area network is a communication network with the human body as a center and composed by various network elements related to the human body. These network elements include a personal terminal, sensors arranged on the human body, or in a range at a certain distance around the human body, or even inside the human body, a networking apparatus, or the like. People can carry out communication through BAN and an electronic apparatus such as a mobile telephone, a tablet computer and a PDA carried on a person's body. At the same time, the BAN can connect with other data communication networks to become a part of the entire communication network to implement communication with any terminal on the network.

Since the electronic apparatus, as one of the network elements of BAN, needs to participate in data communication with the human body as transmission medium, it needs to additionally provide the electronic apparatus with data transmitting and receiving device suitable for BAN communication, which inevitably results in complexity of design of the electronic apparatus and increases of the cost of manufacture. Therefore, it is desired to implement data transmitting and receiving function of the BAN communication based on the conventional component of the electronic apparatus. In recent years, touch screen having both of input and display functions has already widely used in the electronic apparatus such as the mobile telephone, the tablet computer and the PDA. At present, the commercial available touch screen mostly includes a vector pressure sensing type touch screen, a resistance type touch screen, a capacitive type touch screen, an infrared ray touch screen, and a surface acoustic wave touch screen. Wherein, the capacitive type touch screen has become a mainstream selection in the field of touch screen due to fined positioning accuracy, ultra-high response speed, and support to a multipoint touch control function thereof.

The present invention wishes to provide an electronic apparatus and a data transmission method for implementing data transmission of the BAN communication by using the touch screen, which is able to implement the function of data transmission of the BAN communication in addition to the touch screen executing the function of touch input to provide an electronic apparatus participating in the BAN communication with low cost and low complexity of design.

SUMMARY

In concern of the above case, the present invention provides an electronic apparatus and a data transmission method for implementing the function of data transmission of the BAN communication, in addition to the touch screen executing the function of touch input, to provide an electronic apparatus participating in the BAN communication with low cost and low complexity of design.

According to one aspect of the embodiments of the present invention, an electronic apparatus is provided comprising a touch control communication unit for executing touch control input or communication data transmission; a touch control driving unit for providing a driving signal to the touch control communication unit and receiving a touch control signal from the touch control communication unit; a communication driving unit for providing communication data to be sent to the touch control communication unit and receiving communication data from the touch control communication unit; and a control unit for controlling the touch control communication unit to be in a first working status or a second wording state according to a predetermined condition, wherein the touch control communication unit is electrically connected with the touch control driving unit so that the touch control communication unit executes the touch control input in the first working status, and the touch control communication unit is electrically connected with the communication driver element so that the touch control communication unit executes communication data transmission in the second working status.

Also, in the electronic apparatus according to one aspect of the embodiments of the present invention, wherein the touch control communication unit includes a baseboard and an electrode array arranged on the baseboard.

Also, in the electronic apparatus according to one aspect of the embodiments of the present invention, wherein the electrode array includes a scanning electrode array and a driving electrode array, and the communication driving unit includes a communication data receiving unit and a communication data transmitting unit. The scanning electrode array is connected to the touch control driving unit via a scanning line to provide a touch control signal obtained by the scanning electrode array to the touch control driving unit, and the scanning electrode array is connected to the communication data receiving unit via a data receiving to provide the communication received by the scanning electrode array to the communication driving unit. The driving electrode array is connected to the touch control driving unit via a driving line to receive the driving signal provided by the touch control driving unit, and the driving electrode array is connected to the communication data transmitting unit via a data transmitting transmission line to receive communication data provided by the communication data transmitting unit.

Also, in the electronic apparatus according to one aspect of the embodiments of the present invention, there further includes a first switch unit and a second switch unit, wherein the first switch unit is placed between the scanning electrode array and the touch control driving unit and the communication data receiving unit and for making the scanning electrode array be electrically connected with the touch control driving unit or making the scanning electrode array be electrically connected with the communication data receiving unit, according to the control signal from the control unit. The second switch unit is placed between the driving electrode array and the touch control driving unit, and the communication data transmitting unit for making the driving electrode array be electrically connected with the touch control driving unit or making the driving electrode array be electrically connected with the communication data transmitting unit, according to the control signal from the control unit.

Also, in the electronic apparatus according to one aspect of the embodiments of the present invention, wherein the communication data is communication data for body area network.

Also, in the electronic apparatus according to one aspect of the embodiments of the present invention, wherein the communication data conforms to specification of IEEE 802.15.6.

Also, in the electronic apparatus according to one aspect of the embodiments of the present invention, wherein the communication driving unit further includes a modulating and demodulating unit for modulating the communication data transmitted into communication data for the body area network and demodulating the communication data received into data to be processed by the electronic apparatus.

According to another aspect of the embodiments of the present invention, there is provided a data transmission method applied in an electronic apparatus that includes a touch control communication unit for executing touch control input or communication data transmission, a touch control driving unit for providing the touch control communication unit with a driving signal and receiving the touch control signal from the touch control communication unit, a communication driving unit for providing the touch control communication unit with the communication data to be transmitted and receiving communication data from the touch control communication unit, and a control unit for controlling the touch control communication unit to be in a first working status or a second working status according to predetermined condition, the data transmission method including the control unit receiving a working status instruction; the control unit deciding whether the working status instruction indicates that the touch control communication unit is in the first working status or in the second working status based on the working status instruction received; the control unit controlling the touch control communication unit to be electrically connected with the touch control driving unit so that the touch control communication unit executes touch control input if the working status instruction indicates that the touch control communication unit is in the first working status; and the control unit controlling the touch control communication unit to be electrically connected with the communication driving unit so that the touch control communication unit executes communication data transmission if the working status instruction indicates that the touch control communication unit is in the second working status.

Also, in the data transmission method according to another aspect of the embodiments of the present invention, wherein the touch control communication unit includes a baseboard and an electrode array arranged on the baseboard Also, in the data transmission method according to another aspect of the embodiments of the present invention, wherein the electrode array includes a scanning electrode array and a driving electrode array, and the communication driving unit includes a communication data receiving unit and a communication data transmitting unit, wherein the control unit controlling the touch control communication unit to be electrically connected with the touch control driving unit includes the control unit controlling the scanning electrode array to be connected to the touch control driving unit via a scanning line to provide the touch control signal obtained by scanning by the scanning electrode array to the touch control driving unit, and controlling the driving electrode array to be connected to the touch control driving unit via a driving line to receive the driving signal provided by the touch control driving unit.

Also, in the data transmission method according to another aspect of the embodiments of the present invention, wherein the control unit controlling the touch control communication unit to be electrically connected with the communication driving unit includes the control unit controlling the scanning electrode array to be connected to the communication data receiving unit via a data receiving transmission line to provide the communication data received by the scanning electrode array to the communication driving unit, and controlling the driving electrode array to be connected to the communication data transmitting unit via a data transmitting transmission line to receive the communication data provided by the communication data transmitting unit.

Also, in the data transmission method according to another aspect of the embodiments of the present invention, wherein the electronic apparatus further includes a first switch unit and a second switch unit, the first switch unit is placed between the scanning electrode array and the touch control driving unit and the communication data receiving unit, the second switch unit is placed between the driving electrode array and the touch control driving unit and the communication data transmitting unit, wherein the control unit controlling the touch control communication unit to be electrically connected with the touch control driving unit includes the control unit controlling the first switch unit to connect the scanning electrode array with the touch control driving unit, and controlling the second switch unit to connect the driving electrode array with the touch control driving unit.

Also, in the data transmission method according to another aspect of the embodiments of the present invention, wherein the control unit controlling the touch control communication unit to be electrically connected with the communication driving unit includes the control unit controlling the first switch unit to connect the scanning electrode array with the communication data receiving unit, and controlling the second switch unit to connect the driving electrode array with the communication data transmitting unit.

Also, in the data transmission method according to another aspect of the embodiments of the present inventions, wherein the communication data is communication data for body area network.

Also, in the data transmission method according to another aspect of the embodiments of the present inventions, wherein the communication data conforms to specification of IEEE 802.15.6.

Also, in the data transmission method according to another aspect of the embodiments of the present inventions, wherein the communication driving unit further includes a modulating and demodulating unit for modulating the communication data transmitted into communication data for the body area network and demodulating the communication data received into data to be processed by the data transmission method.

The electronic apparatus and the data transmission method according to the embodiments of the present invention can implement the function of data transmission of the BAN communication in addition to making the touch screen execute the function of touch input, so as to provide an electronic apparatus participating in the BAN communication with low cost and complexity of design.

It is to be understood that both the previous general description and the following detailed description are schematic, and intended to provide a further explanation of the technology sought for protection.

DETAILED DESCRIPTION

Hereinafter, a plurality of embodiments, applications, and modifications are described with reference to the accompanying drawings. Further, the embodiments described in the following are preferable specific examples and are provided with various technical preferable limitations, however, in the following description, the present invention is not limited to these embodiments.

Here, it is noted that the same reference numbers are given to constituent parts with substantially same or similar structures and functions, and the repetitive descriptions thereof are omitted.

Firstly, the electronic apparatus according to the first embodiment of the present invention is described with reference to FIG. 1. For example, the electronic apparatus is preferably a smart phone, a PDA, and a tablet computer or the like.

Figure 1:
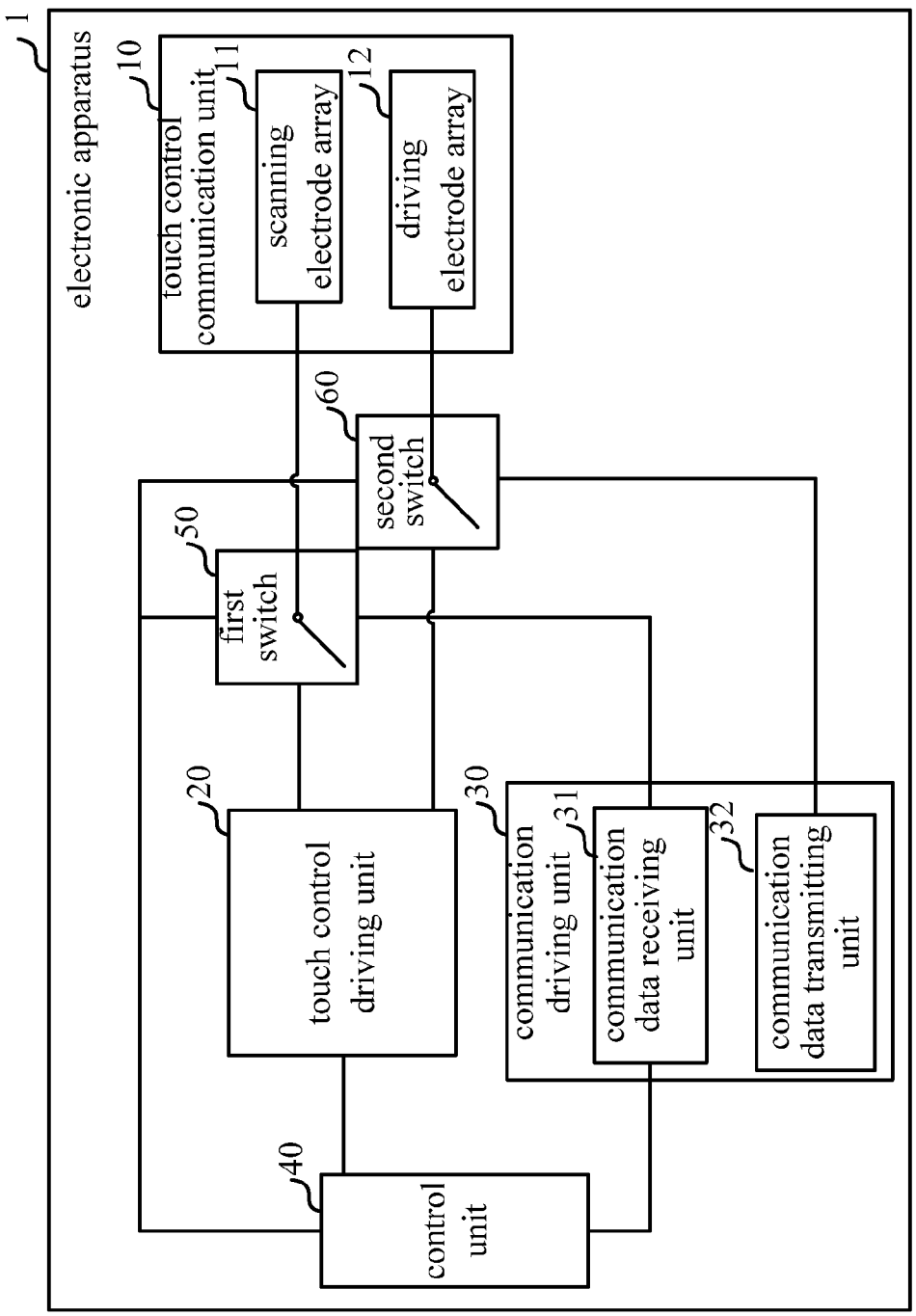
FIG. 1 is a schematic diagram illustrating principle structure of the electronic apparatus according to the first embodiment of the present invention.

As shown in FIG. 1, the electronic apparatus 1 according to the first embodiment of the present invention has a touch control communication unit 10, a touch control driving unit 20, a communication driving unit 30, a control unit 40, a first switch 50 and a second switch 60. It is easy to understand that, FIG. 1 only shows components with close relationship with the present invention in order for simplicity, and of course the electronic apparatus 1 according to the first embodiment of the present invention can include other components such as a display unit, a communication unit or the like.

In particular, the touch control communication unit 10 of the electronic apparatus 1 shown in FIG. 1 is for executing touch control input or communication data transmission. The touch control communication unit 10 includes a baseboard and an electrode array arranged on the baseboard. As shown in FIG. 1, the electrode array in the touch control communication unit 10 further includes a scanning electrode array 11 and a driving electrode array 12. In a preferable embodiment of the present invention, the touch control communication unit 10 is a capacitive touch screen of the electronic apparatus 1 such as a smart phone, a PDA and a tablet computer and can provide touch control operation input to the electronic apparatus 1.

The touch control driving unit 20 of the electronic apparatus 1 shown in FIG. 1 is for providing a driving signal to the touch control communication unit 10 and receiving a touch control signal from the touch control communication unit 10. As shown in FIG. 1, the scanning electrode array 11 is connected to the touch control driving unit 20 via a scanning line to provide the touch control signal obtained by scanning by the scanning electrode array 11 to the touch control driving unit 20, and the driving electrode array 12 is connected to the touch control driving unit 20 via a driving line to receive a driving signal provided by the touch control driving unit 20.

The communication driving unit 30 of the electronic apparatus 1 shown in FIG. 1 is for providing communication data to be transmitted to the touch control communication unit 10 and receiving communication data from the touch control communication unit 10. The communication driving unit 30 further includes a communication data receiving unit 31 and a communication data transmitting unit 32. As shown in FIG. 1, the scanning electrode array 11 is connected to the communication data receiving unit 31 via a data receiving transmission line to provide the communication data received by the scanning electrode array 11 to the communication driving unit 30, and the driving electrode array 12 is connected to the communication data transmitting unit 32 via a data transmitting transmission line to receive the communication data provided by the communication data transmitting unit 32.

The control unit 40 of the electronic apparatus 1 shown in FIG. 1 is for controlling the touch control communication unit 10 to be in a first working status or a second working status according to predetermined conditions. In particular, in the first working status, the touch control communication unit 10 is electrically connected to the touch control driving unit 20 and the touch control communication unit 10 executes the touch control input, and in the second working status, the touch control communication unit 10 is electrically connected to the communication driving unit 30 and the touch control communication unit 10 executes the communication data transmission. The control unit 40 can be further connected to a central processing unit and a storing unit (not shown) of the electronic apparatus 1, and is for providing the touch control signal received from the touch control communication unit 10 via the touch control driving unit 20 to the central processing unit, so as to carry out corresponding control processing by the central processing unit. The control unit 40 is further for transmitting the communication data to be transmitted as obtained from the central processing unit and the storing unit to the touch control communication unit 10 via the communication driving unit 30 for transmission, and providing the communication data received from the touch control communication unit 10 via the communication driving unit 30 to the central processing unit and the storing unit.

The first switch 50 of the electronic apparatus 1 shown in FIG. 1 is placed between the scanning electrode array eleven and the touch control driving unit 20 and the communication data receiving unit 31, and is for making the scanning electrode array 11 be electrically connected with the touch control driving unit 20 or making the scanning electrode array 11 be electrically connected with the communication data receiving unit 31 according to the control signal from the control unit 40. The second switch 60 of the electronic apparatus 1 shown in FIG. 1 is placed between the driving electrode array 12 and the touch control driving unit 20 and the communication data transmitting unit 32, and is for making the driving electrode array 12 be electrically connected with the touch control driving unit 20 or making the driving electrode array 20 be electrically connected with the communication data transmitting unit 32 according to the control signal from the control unit 40. In particular, in the first working status, the first switch 50 makes the scanning electrode array 11 be electrically connected with the touch control driving unit 20, and the second switch 60 makes the driving electrode array 12 be electrically connected with the touch control driving unit 20. In the second working status, the first switch 50 makes the scanning electrode array 11 be electrically connected with the communication data receiving unit 31, and the second switch 60 makes the driving electrode array 12 be electrically connected with the communication data transmitting unit 32.

Figure 2:
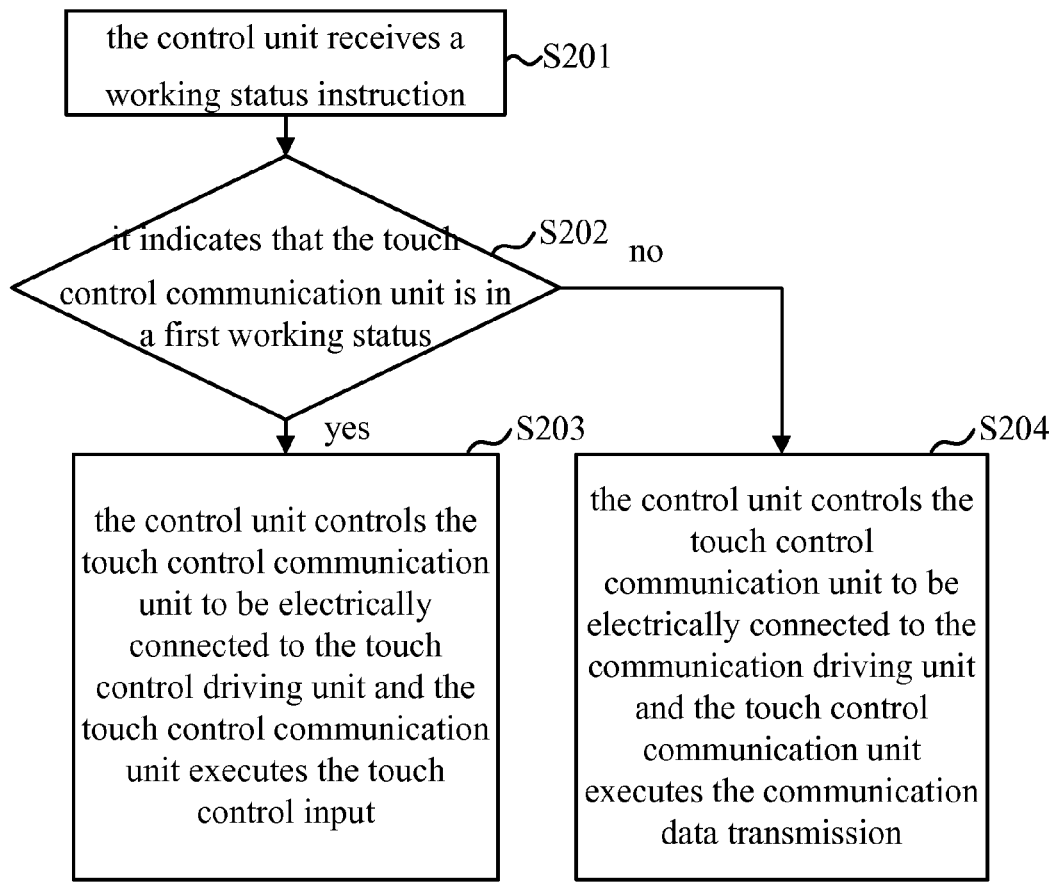
FIG. 2 is a flow chart illustrating the data transmission method according to the second embodiment of the present invention.

The electronic apparatus 1 according to the first embodiment of the present invention is described with reference to FIG. 1 above. Hereinafter, the data transmission method according to the second embodiment of the present invention is described with reference to FIG. 2. As shown in FIG. 2, the data transmission method according to the second embodiment of the present invention includes the following steps:

In step S201, the control unit 40 receives a working status instruction. In a preferable embodiment of the present invention, the working status instruction is inputted by the user of the electronic apparatus 1, or is generated automatically by the central processing unit of the electronic apparatus 1 according to specific application and sent to the control unit 40. Then, the processing proceeds to step S202.

In step S202, the control unit 40 decides whether the working status instruction indicates that the touch control communication unit 10 is in the first working status. As described with reference to FIG. 1 above, the first working status is a status in which the touch control communication unit 10 executes the touch control input, and the second working status is a status in which the touch control communication unit 10 executes the communication data transmission.

If a positive result is obtained in step S202, that is, the working status instruction indicates that the touch control communication unit 10 is in the first working status, then the processing proceeds to step S203.

In step S203, the control unit 40 controls the touch control communication unit 10 to be electrically connected with the touch control driving unit 20, so that the touch control communication unit 10 executes the touch control input.

In contrary, if a negative result is obtained in step S202, that is, the working status instruction indicates that the touch control communication unit 10 is in the second working status, then the processing proceeds to step S204.

In step S204, the control unit 40 controls the touch control communication unit 10 to be electrically connected with the communication driving unit 30, so that the touch control communication unit 10 executes the communication data transmission.

Thus, the control unit 40 can generate the working status instruction according to input of the user or generate the working status instruction automatically by the central processing unit, and can control the touch control communication unit 10 to execute the touch control input or the communication data transmission, without being further configured with additional components.

Hereinafter, the first working status and the second working status of the electronic apparatus 1 according to the first embodiment of the present invention are further described specifically with reference to FIGS. 3 and 4.

Figure 3:
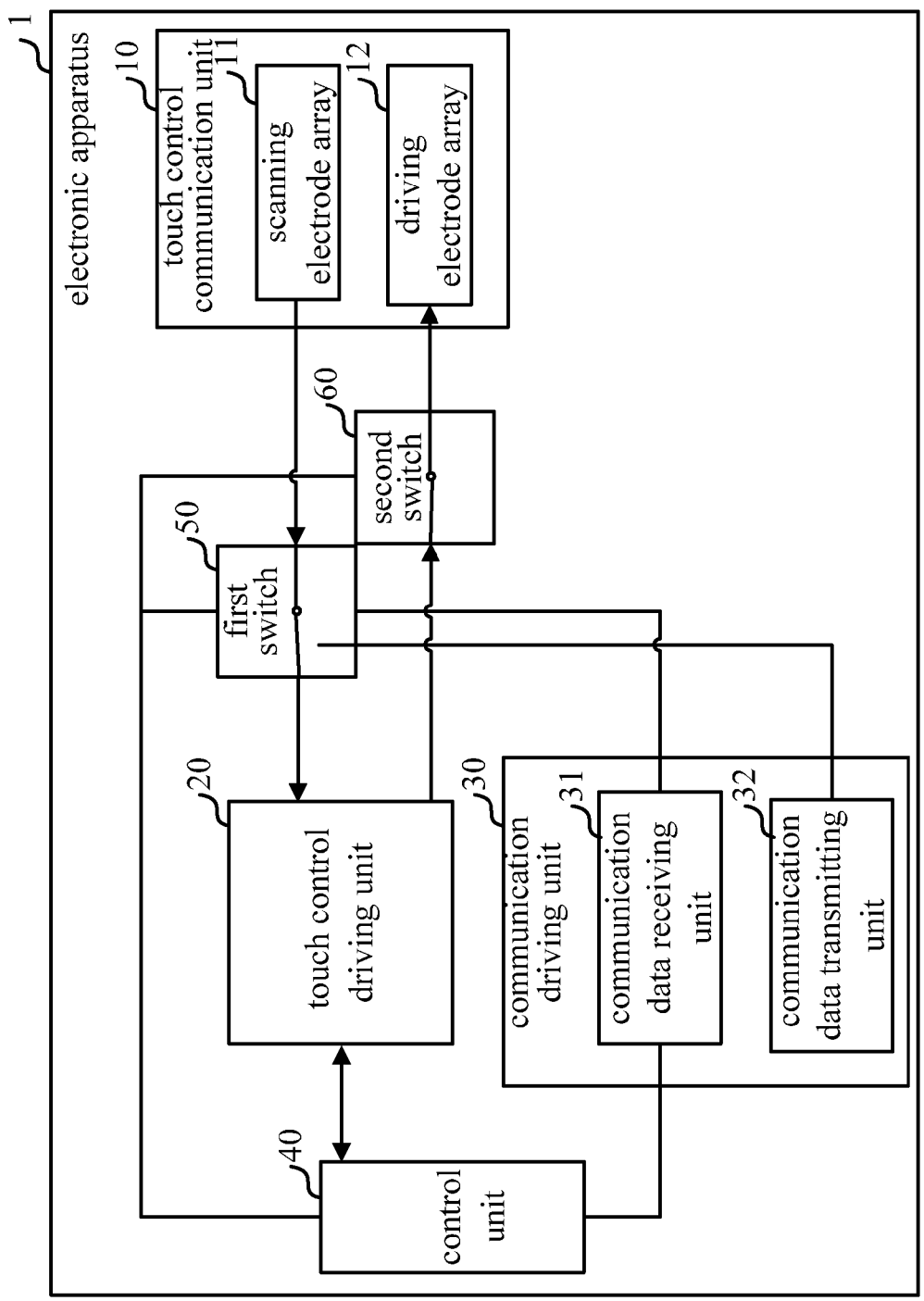
FIG. 3 is a schematic diagram illustrating the first working status of the electronic apparatus according to the first embodiment of the present invention.

FIG. 3 is a schematic diagram illustrating the first working status of the electronic apparatus according to the first embodiment of the present invention. The solid line with arrow in FIG. 3 indicates direction of the flow of data by the arrow thereof.

As shown in FIG. 3, the electronic apparatus 1 is in the first working status, i.e., the touch control communication unit 10 of the electronic apparatus 1 executes the touch control input. In particular, in the first working status, the control unit 40 transmits the control signal to the first switch 50 and the second switch 60, so that the first switch 50 is turned on between the scanning electrode array 11 and the touch control driving unit 20, and the second switch 60 is turned on between the driving electrode array 12 and the touch control driving unit 20. At this time, the scanning electrode array 11 is connected to the touch control driving unit 20 via a scanning line, to provide the touch control signal obtained by scanning by the scanning electrode array 11 to the touch control driving unit 20. The touch control driving unit 20 further provides the touch control signal to the control unit 40, and then the touch control signal is processed by the control unit 40 and further provided to the central processing unit, so that the central processing unit executes corresponding control operation in response to the obtained touch control signal. The driving electrode array 12 is connected to the touch control driving unit 20 via a driving line, so that the touch control driving unit 20 provides the driving signal to the driving electrode array 12, in order that the driving electrode array 12 drives the scanning electrode array 11 to execute a touch control scanning. As described in the above, in the first working status of the electronic apparatus 1 shown in FIG. 3, the touch control communication unit 10 (touch control screen) of the electronic apparatus 1 is used as an input unit of the touch control instruction.

Figure 4:
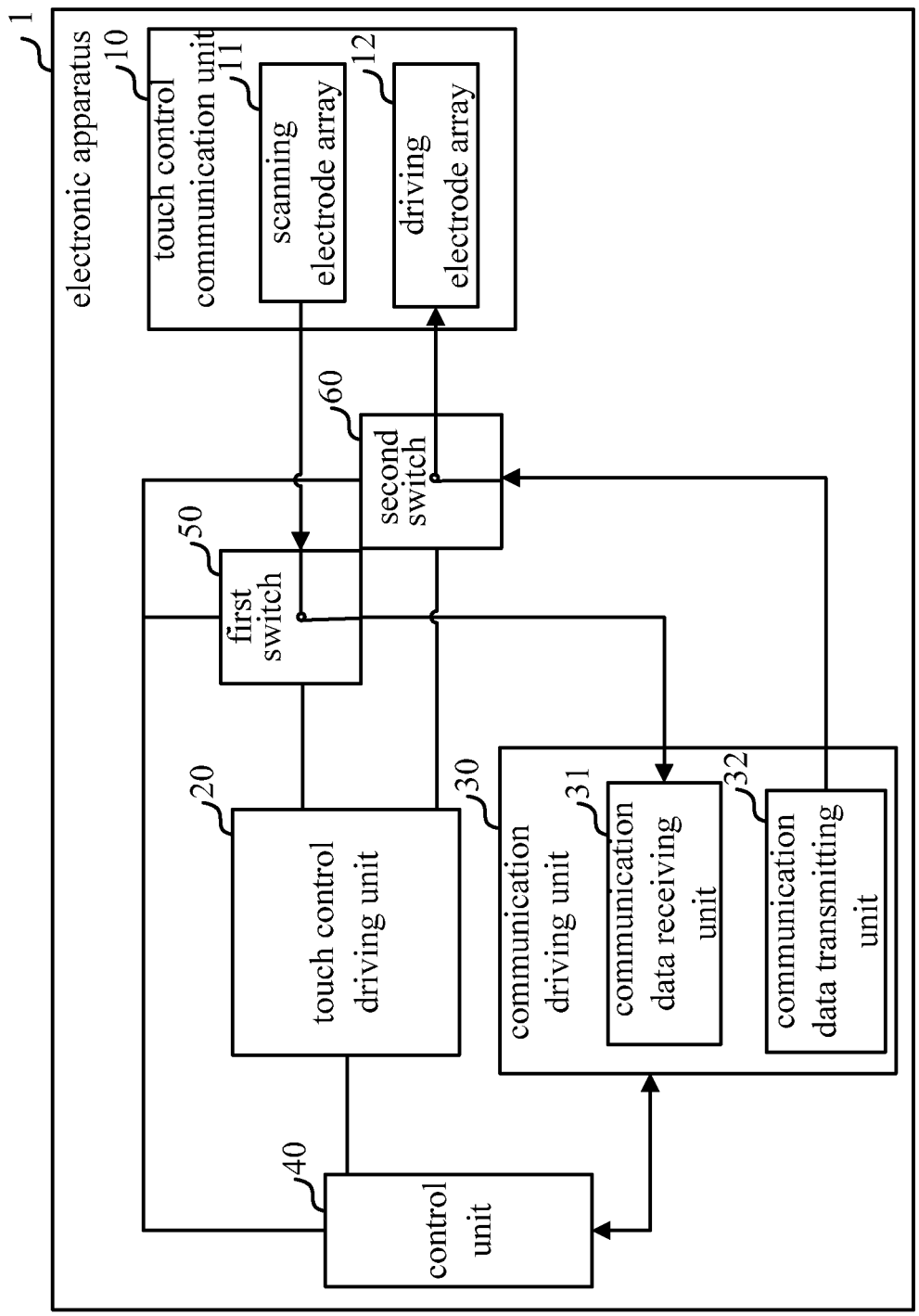
FIG. 4 is a schematic diagram illustrating the second working status of the electronic apparatus according to the first embodiment of the present invention.

FIG. 4 is a schematic diagram illustrating the second working status of the electronic apparatus according to the first embodiment of the present invention. Similarly, the solid line with arrow in FIG. 4 indicates direction of the flow of data by the arrow thereof.

As shown in FIG. 4, the electronic apparatus 1 is in the second working status, i.e., the touch control communication unit 10 of the electronic apparatus 1 executes the communication data transmission. In particular, in the second working status, the control unit 40 transmits the control signal to the first switch 50 and the second switch 60, so that the first switch 50 is turned on between the scanning electrode array 11 and the communication data receiving unit 31, and the second switch 60 is turned on between the driving electrode array 12 and the communication data transmitting unit 32. At this time, in a communication data receiving mode, the scanning electrode array 11 is connected to the communication data receiving unit 31 via a data receiving transmission line, to provide the communication data received by the scanning electrode array 11 to the communication driving unit 30. The communication data receiving unit 31 provides the communication data received via the scanning electrode array 11 to the control unit 40, and then the communication data is processed by the control unit 40 and further provided to the central processing unit and the storing unit, so as to be processed by the central processing unit and stored by the storing unit. In a communication data transmitting mode, the driving electrode array 12 is connected to the communication data transmitting unit 32 via a data transmitting transmission line to receive the communication data provided by the communication data transmitting unit 32. The communication data provided by the communication data transmitting unit 32 is from the communication data acquired by the control unit 40 from the central processing unit and the storing unit. In a preferable embodiment of the present invention, the communication driving unit 30 further includes a modulating and demodulating unit (not shown) for modulating the communication data to be transmitted into communication data for a body area network and demodulating the received communication data into data to be processed by the electronic apparatus. In the preferable embodiment, the modulating and demodulating unit executes modulation and demodulation conforming to specification of IEEE 802.15.6, which is a standard of short distance wireless networks composed of various sensors and devices configured at periphery of the human body. As described in the above, in the second working status of the electronic apparatus 1 shown in FIG. 4, the touch control communication unit 10 of the electronic apparatus 1 is used as a data communication unit which can transmit the communication data to be transmitted to another electronic apparatus via the human body contact therewith and receive the communication data transmitted via the human body contact therewith from the another electronic apparatus.

The electronic apparatus and the data transmission method thereof according to the embodiments of the present invention are described with reference to FIGS. 1 to 4 above. The electronic apparatus according to the embodiments of the present invention implements data transmission of the BAN communication by using the touch screen without being configured with additional components. The touch screen can implement the function of data transmission of the BAN communication in addition to executing the function of touch input, to provide an electronic apparatus participating in the BAN communication with low cost and low complexity of design.

As described in the above, with the development of touch technique, more and more terminal electronic apparatus (for example, a smart phone, a tablet computer, a notebook computer or a desktop computer or the like) has equipped with a screen having touch function. Currently, the touch screen of these terminal electronic apparatus can only recognize a touch position and number of touch point (multipoint touch) of the user of the terminal electronic apparatus generally, and does not have an ability of distinguishing different users of the terminal electronic apparatus. Therefore, a customized service and/or application (for example, a customized interface, a customized use authority or the like) cannot be provided to the user according to the change of the user of the terminal electronic apparatus, and at this time, the user has to set the terminal electronic apparatus manually to switch the user. In this case, it generally causes inconvenience of the user.

Therefore, in order to solve the above-described technical problems in the prior art, according to yet another aspect of the embodiments of the present invention, there is provided an electronic apparatus comprising a touch panel on which a scanning electrode array and a driving electrode array are provided; a scanning line configured to be connected with the scanning electrode array and transmit a sensing signal from the scanning electrode array; a driving line configured to be connected with the driving electrode array and transmit a driving signal to the driving electrode array; a driving/scanning unit connected with the scanning line and the driving line and configured to receive the sensing signal from the scanning line and provide the driving signal to the driving line; a user recognizing unit configured to be connected with at least one of the scanning line and the driving line and receive a user recognition signal applied to the touch panel through at least one of the scanning line and the driving line to recognize the user.

According to yet another aspect of the embodiments of the present invention, wherein the user recognition signal is generated by a user recognition signal generating apparatus.

According to yet another aspect of the embodiments of the present invention, wherein the user recognition signal generating apparatus further includes a user recognition signal generating unit configured to generate a user recognition signal corresponding to the wearer of the user recognition signal generating apparatus; and a first interface configured to be contacted with the wearer and transmit the user recognition signal to the wearer.

According to yet another aspect of the embodiments of the present invention, wherein the user recognition signal is applied to the touch panel when the finger/palm of the wearer contacts with the touch panel.

According to yet another aspect of the embodiments of the present invention, wherein the user cognition unit is connected with the scanning line, and the electronic apparatus further includes a first switch that is connected with the driving/scanning unit the scanning line and the user recognizing unit respectively and controls the driving/scanning unit and the user recognizing unit to be connected with/disconnected from the scanning line, wherein the first switch connects the driving/scanning unit and the scanning line and disconnects the user recognizing unit and the scanning line in a first time period of a first circle, and connects the user recognizing unit and the scanning line and disconnects the driving/scanning unit and the scanning line in a second time period of the first circle.

According to yet another aspect of the embodiments of the present invention, wherein the user cognition unit is connected with the driving line, and the electronic apparatus further includes a second switch that is connected with the driving/scanning unit and the driving line and the user recognizing unit respectively and controls the driving/scanning unit and the user recognizing unit to be connected with/disconnected from the driving line, wherein the second switch connects the driving/scanning unit and the driving line and disconnects the user recognizing unit and the driving line in a first time period of a first circle, and connects the user recognizing unit and the driving line and disconnects the driving/scanning unit and the driving line in a second time period of the first circle.

According to yet another aspect of the embodiments of the present invention, wherein the first circle corresponds to a frequency of receiving the sensing signal from the scanning line or a frequency of providing the driving signal to the driving line by the driving/scanning unit.

According to yet another aspect of the embodiments of the present invention, wherein the frequency of the user recognition signal is higher than the frequency corresponding to the first circle and the frequency of the user recognition signal represents the wearer of the user recognition signal generating apparatus.

Further, according to yet another aspect of the embodiments of the present invention, there is provided a user recognizing method applied in an electronic apparatus that includes a touch panel on which a scanning electrode array and a driving electrode array are provided, a scanning line that is connected with the scanning electrode array and transmits a sensing signal from the scanning electrode array, a driving line that is connected with the driving electrode array and transmits a driving signal to the driving electrode array, a driving/scanning unit that is connected with the scanning line and the driving line and configured to receive the sensing signal from the scanning line and provide the driving signal to the driving line, and a user recognizing unit connected with at least one of the scanning line and the driving line, the user recognizing method including receiving the user recognition signal applied to the touch panel through at least one of the scanning line and the driving line; and recognizing the user based on the user recognition signal.

According to yet another aspect of the embodiments of the present invention, wherein the user recognition signal is generated by the user recognition signal generating apparatus and applied to the wearer of the user recognition signal generating apparatus, and the user recognition signal is applied to the touch panel when finger/palm of the wearer contacts with the touch panel.

Figure 5:
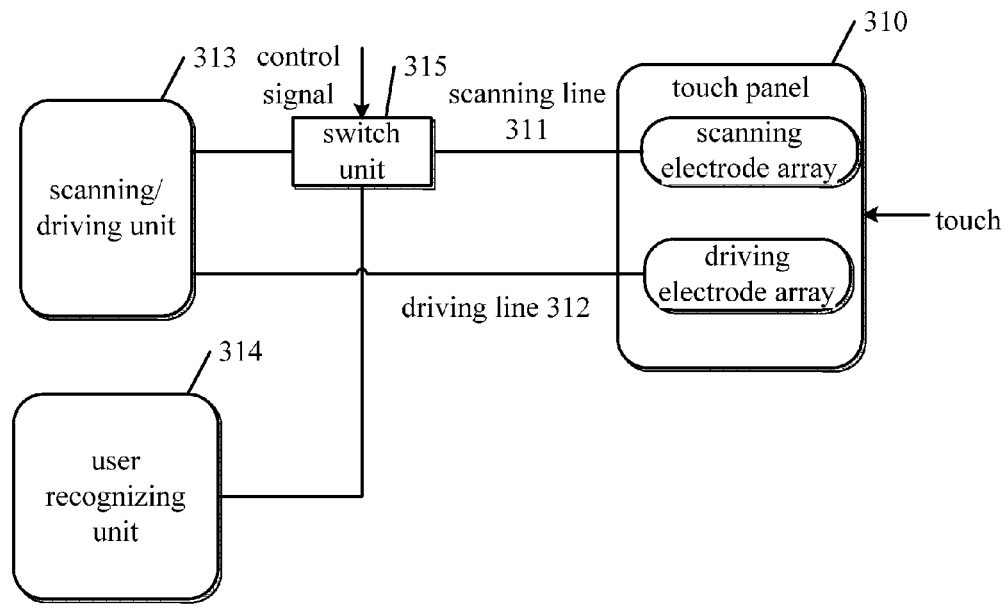
FIG. 5 is a schematic block diagram illustrating the electronic apparatus according to the third embodiment of the present invention.

Different implementation modes of the electronic apparatus according to the embodiments of the present invention are described with reference to FIGS. 5 to 8 as follows. FIG. 5 is a schematic block diagram illustrating the electronic apparatus according to the third embodiment of the present invention.

Here, the electronic apparatus according to the embodiments of the present invention may be any terminal electronic apparatus having a display screen with touch function or a touch control panel (for example, a smart phone, a tablet computer, a notebook computer or a desktop computer or the like). Here, the electronic apparatus according to the embodiments of the present invention may include a touch panel, a scanning line, a driving line, a scanning/driving unit and a user recognizing unit.

In particular, the touch panel may be implemented by any capacitive type touch panel on which a scanning electrode array and a driving electrode array may be provided. The scanning line can be connected with the scanning electrode array and can transmit a sensing signal from the scanning electrode array on the touch panel (which is changed by the touch of the user and referred to as a first sensing signal). The driving line can be connected with the driving electrode array and can transmit a driving signal to the driving electrode array. The driving/scanning unit can be connected with the scanning line and the driving line, and can receive the sensing signal from the scanning line and provide the driving signal to the driving line. Here, the touch panel, the scanning line, the driving line and the scanning/driving unit implement touch control function of the electronic apparatus and, since the structure and function of the above elements are known for those skilled in the art, they are no longer described here. When the above elements are integrated on display screen of the electronic apparatus, the above elements can be used as a part of the touch screen, and when the above elements are integrated on other positions of the electronic apparatus, the above elements can form a part of the touch control panel of the electronic apparatus. Further, the user recognizing unit of the electronic apparatus can be connected with at least one of the scanning line and the driving line (for example, through a switch unit), and can receive the user recognition signal applied to the touch panel through at least one of the scanning line and the driving line to recognize the user.

As shown in FIG. 5, the electronic apparatus according to the third embodiment of the present invention may include a touch panel 310, a scanning line 311, a driving line 312, a scanning/driving unit 313, a user recognizing unit 314 and a switch unit 315.

Here, a scanning electrode array including a plurality of scanning electrodes and a driving electrode array including a plurality of driving electrodes are provided on the touch panel 310. The scanning line 311 can be connected with the scanning electrode array on the touch panel 310. The scanning line 311 can send a first sensing signal from the scanning electrode array on the touch panel 310 (changed by the touch of the user) to the scanning/driving unit 313. The driving line 312 can be connected with the driving electrode array on the touch panel 310, and can transmit a driving signal sent from the driving/scanning unit 313 to the driving electrode array. The driving/scanning unit 313 can be connected with the scanning line and the driving line. The driving/scanning unit 313 can transmit a driving signal to the driving line 312 at a preset frequency (generally several KHz to several tens of KHZ). Further, the driving/scanning unit 313 may also monitor the first sensing signal generated on the scanning electrode array due to the touch of the user of the electronic apparatus and transmitted by the scanning line 311 to implement the function of detecting a touch position of the user.

The user recognizing unit 314 can be implemented by an arbitrary processor or microprocessor, the user recognizing unit 314 can execute preset processing based on program or firmware installed or solidified therein. According to the third embodiment of the present invention, the user recognizing unit 314 can recognize the user using the electronic apparatus based on the user recognition signal applied to the touch panel 310.

In particular, the user recognizing unit 314 receives the user recognition signal from the scanning line 311 through the switch unit 315. The switch unit 315 can be implemented by an arbitrary switch. The switch unit 315 is connected with the driving/scanning unit 313, the scanning line 311 and the user recognizing unit 314 respectively, and can control the connection/disconnection of the driving/scanning unit 313 and the user recognizing unit 314 and the scanning line 311 based on the control signal. For example, the control signal can be generated by the user recognizing unit 314 or generated by a control module (not shown) set in the touch screen or the touch control panel of the electronic apparatus.

Figure 7:
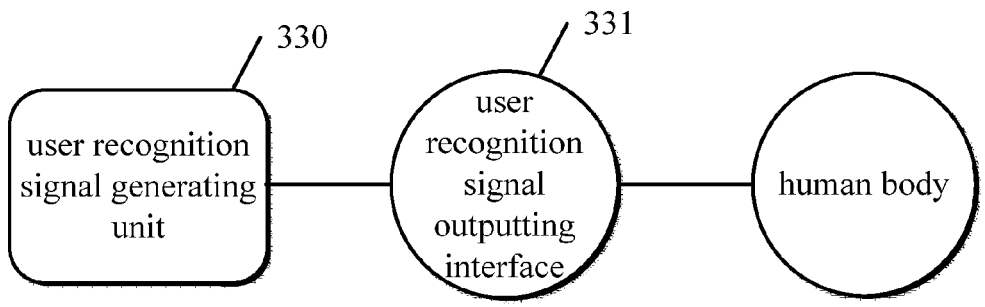
FIG. 7 is a schematic block diagram illustrating a user recognition signal generating unit of the electronic apparatus according to the exemplary embodiment of the present invention.

Here, the user recognition signal applied to the touch panel 310 is described firstly. For example, the user recognition signal can be generated by a specific user recognition signal generating apparatus. In particular, as shown in FIG. 7, the user recognition signal generating apparatus may include a user recognition signal generating unit 330 and a user recognition signal output interface 331. The user recognition signal generating unit 330 can be implemented by an arbitrary high frequency signal generator, and can generate a user recognition signal corresponding to the wearer of the user recognition signal generating apparatus. For example, the user recognition signal may be a frequency signal unique to a specific user, and different users can be recognized by determining the frequency of the user recognition signal. Further, the user recognition signal may also be a code signal unique to a specific user, and different users may be recognized by determining the code in the user recognition signal. Here, the user recognition signals corresponding uniquely may be designed for different users in advance, or may be generated by selection of the user. The user recognition signal output interface 331 may be a metal electrode, and can contact with the body of the wearer of the user recognition signal generating apparatus. In this case, the user recognition signal output interface 331 can be connected to the user recognition signal generating unit 330 to receive the user recognition signal, and transmit the user recognition signal to the wearer of the user recognition signal generating apparatus when it contacts with the body of the user (wearer) of the electronic apparatus.

In this case, since the human body is electrically conductive, the user recognition signal transmitted to the wearer by the user recognition signal output interface 331 when it contacts with the body of the user (wearer) of the electronic apparatus can be transmitted through the body of the wearer. In this case, if the finger/palm of the wearer contacts with the touch panel 310, the user recognition signal is applied to the touch panel 310 when the finger/palm of the wearer contacts with the touch panel 310. Here, according to structures of the touch panel 310 (the scanning electrode array and the driving electrode array), if the user recognition signal is applied to the touch panel 310, a sensing signal corresponding to the user recognition signal (hereinafter referred to as second sensing signal) can be generated on the scanning electrode array and the driving electrode array, and the frequency and waveform of the second sensing signal is consistent with the user recognition signal. In this case, the second sensing signal can be obtained by the scanning line 311 or the driving line 312 connected with the scanning electrode array and the driving electrode array.

Therefore, according to the third embodiment of the present invention, the second sensing signal can be obtained through the scanning line 311. The procedure of obtaining the second sensing signal through scanning line 311 is described hereinafter.

As described in the above, the switch unit 315 is connected with the driving/scanning unit 313, the scanning line 311 and the user recognizing unit 314 respectively, and can control the connection/disconnection of the driving/scanning unit 313 and the user recognizing unit 314 with the scanning line 311 based on the control signal. Here, similar to the prior art, the driving/scanning unit 313 generally transmits a driving signal (driving pulse) to the driving line 312 at a preset frequency (for example, several KHz to several tens of KHz), monitors the first sensing signal (sensing pulse) through the scanning line 311, and the frequency of the first sensing signal is consistent with the frequency of the driving signal. Therefore, in order to implement the function of user recognition without influencing the touch function of the electronic apparatus, the scanning line 311 can be used to transmit the second sensing signal corresponding to the user recognition signal in a time period of low level of the first sensing signal.

In particular, the control signal provided to the switch unit 315 can be configured, so that the switch unit 315 connects the driving/scanning unit 313 and the scanning line 311 and disconnects the user recognizing unit 314 and the scanning line 311 in a first time period in the preset circle. Further, the control signal can be configured, so that the switch unit 315 connects the user recognizing unit 314 and the scanning line 311 and disconnects the driving/scanning unit 313 and the scanning line 311 in a second time period in the preset circle. Here, the preset circle corresponds to the frequency of receiving the first sensing signal (changed by the touch of the user) from the scanning line by the driving/scanning unit 313. In particular, the first time period in the preset circle can correspond to a circle of high level of the first sensing signal, and the second time period in the preset circle can correspond to a circle of low level of the first sensing signal. In this case, in the first time period in the preset cycle, when the switch unit 315 connects the driving/scanning unit 313 and the scanning line 311 and disconnects the user recognizing unit 314 and the scanning line 311, the driving/scanning unit 313 is connected with the scanning line 311 and can receive the first sensing signal from the scanning line 311, so as to implement functions of touch sensing and subsequent touch position determination. Further, in the second time period in the preset cycle, when the switch unit 315 connects the user recognizing unit 314 and the scanning line 311 and disconnects the driving/scanning unit 313 and the scanning line 311, the user recognizing unit 314 is connected with the scanning line 311 and can receive the second sensing signal from the scanning line 311. In this case, the user recognizing unit 314 can obtain the second sensing signal corresponding to the user recognition signal, so as to recognize the wearer wearing the user recognition signal generating apparatus. Here, user recognition information can be stored in the user recognizing unit 314 in advance to recognize the user recognition signal. For example, when the user recognition signal is a frequency signal unique to a specific user, a plurality of frequency information can be set in the user recognizing unit 314, and the frequency signal is matched with the pre-stored frequency information to recognize the user. Further, when the user recognition signal is a code signal unique to a specific user, a plurality of code information can be set in the user recognizing unit 314, and the code signal is matched with the pre-stored code information to recognize the user.

Further, it needs to note that, since a complete user recognition signal needs to be transmitted in the second time period in the preset cycle, the frequency of the user recognition signal needs to be higher than the frequency corresponding to the preset cycle. For example, the frequency of the user recognition signal may between several MHz and several hundreds of MHz. Here, as long as the complete user recognition signal can be transmitted in the second time period in the preset cycle, the frequency of the user recognition signal is not limited. For example, in a case that the frequency corresponding to the preset cycle is several KHz, the frequency of the user recognition signal may be several tens of KHz.

With the above-described configuration, the user of the electronic apparatus can be recognized based on the user recognition signal applied to the touch panel 10 without influencing the touch function of the electronic apparatus, thus, a customized service or processing can be provided based on the recognized user, so as to improve ease of use and feeling of use of the electronic apparatus considerably.

Figure 6:
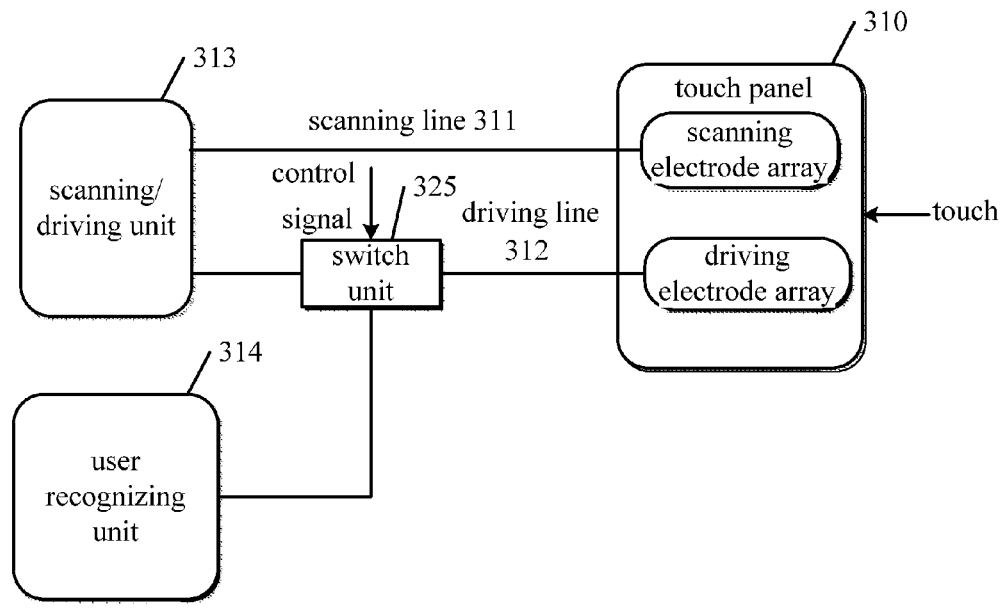
FIG. 6 is a schematic block diagram illustrating the electronic apparatus according to the fourth embodiment of the present invention.

The electronic apparatus according to the fourth embodiment of the present invention is described with reference to FIG. 6 hereinafter. FIG. 6 is a schematic block diagram illustrating the electronic apparatus according to the fourth embodiment of the present invention.

As shown in FIG. 6, the electronic apparatus according to the fourth embodiment of the present invention may include a touch panel 310, a scanning line 311, a driving line 312, a scanning/driving unit 313, a user recognizing unit 314 and a switch unit 325. Here, since the touch panel 310, the scanning line 311, the driving line 312, the scanning/driving unit 313, the user recognizing unit 314 are same as or similar to the corresponding elements in the third embodiment, they are only described simply here.

A scanning electrode array including a plurality of scanning electrodes and a driving electrode array including a plurality of driving electrodes are provided on the touch panel 310. The scanning line 311 is connected with the scanning electrode array on the touch panel 310 and can transmit the first sensing signal from the scanning electrode array on the touch panel 310 to the scanning/driving unit 313. The driving line 312 is connected with the driving electrode array on the touch panel 310, and can transmit a driving signal to the driving electrode array. The driving/scanning unit 313 is connected with the scanning line 311 and the driving line 312, and can transmit a driving signal to the driving line 312 at a preset frequency (several KHz to several tens of KHz generally) and monitor the first sensing signal sent by the scanning line 311 to implement the function of detecting touch position of the user.

The user recognizing unit 314 can recognize the user using the electronic apparatus based on the user recognition signal applied to the touch panel 310. The user recognition signal is generated by specific user recognition signal generating apparatus as in the description of the third embodiment. The user recognition signal generating apparatus may include a user recognition signal generating unit 330 and a user recognition signal output interface 331. The user recognition signal generating unit 330 can generate a user recognition signal corresponding to the wearer of the user recognition signal generating apparatus (a frequency signal or a code signal unique to the user), and can recognize different users by recognizing the user recognition signal. The user recognition signal output interface 331 can be connected with the user recognition signal generating unit 330 to receive the user recognition signal, and transmit the user recognition signal to the wearer of the user recognition signal generating apparatus when it contacts with the body of the user (wearer) of the electronic apparatus.

In this case, since the human body is electrically conductive, if the finger/palm of the wearer contacts with the touch panel 310, the user recognition signal is applied to the touch panel 310 when the finger/palm of the wearer contacts with the touch panel 310. Here, according to structures of the touch panel 310 (the scanning electrode array and the driving electrode array), if the user recognition signal is applied to the touch panel 310, a second sensing signal corresponding to the user recognition signal can be generated in the scanning electrode array and the driving electrode array, and the frequency and waveform of the second sensing signal is consistent with the user recognition signal. In this case, the second sensing signal can be obtained by the scanning line 311 or the driving line 312 connected with the scanning electrode array and the driving electrode array.

In particular, the user recognizing unit 314 receives the user recognition signal from the driving line 312 through the switch unit 325. The switch unit 325 can be implemented by an arbitrary switch. The switch unit 325 is connected with the driving/scanning unit 313, the driving line 312 and the user recognizing unit 314 respectively, and can control the connection/disconnection of the driving/scanning unit 313 and the user recognizing unit 314 with the driving line 312 based on the control signal. For example, the control signal can be generated by the user recognizing unit 314 or generated by a control module (not shown) set in the touch screen or the touch control panel of the electronic apparatus.

Therefore, according to the fourth embodiment of the present invention, the second sensing signal can be obtained through the driving line 312. The procedure of obtaining the second sensing signal through driving line 312 is described hereinafter.

Here, similar to the prior art, the driving/scanning unit 313 generally transmits the driving signal (driving pulse) to the driving line 312 at the preset frequency (for example, several KHz to several tens of KHz). Therefore, during a low level time period of the driving signal, the driving line 312 can be used for transmitting the second sensing signal corresponding to the user recognition signal.

In particular, the control signal provided to the switch unit 325 can be configured, so that the switch unit 325 connects the driving/scanning unit 313 and the driving line 312 and disconnects the user recognizing unit 314 and the driving line 312 in a first time period in the preset circle. Further, the control signal can be configured, so that the switch unit 325 connects the user recognizing unit 314 and the driving line 312 and disconnects the driving/scanning unit 313 and the driving line 312 in a second time period in the preset circle. Here, the preset cycle corresponds to the frequency of transmitting the driving signal to the driving line 312 by the driving/scanning unit 313. In particular, the first time period in the preset circle can correspond to a circle of high level of the driving signal, and the second time period in the preset circle can correspond to a circle of low level of the driving signal. In this case, in the first time period in the preset cycle, the switch unit 325 connects the driving/scanning unit 313 and the driving line 312, and disconnects the user recognizing unit 314 and the driving line driving line, the driving/scanning unit 313 is connected with the driving line 312 and can transmit the driving signal to the driving line 312. Further, in the second time period in the preset cycle, when the switch unit 325 connects the driving/scanning unit 313 and the driving line 312, and disconnects the user recognizing unit 314 and the driving line 312, the user recognizing unit 314 is connected with the driving line 312 and can receive the second sensing signal from the driving line 312. In this case, the user recognizing unit 314 can obtain the second sensing signal corresponding to the user recognition signal, so as to recognize the wearer wearing the user recognition signal generating apparatus. Here, similar to the description of the third embodiment, user recognition information can be pre-stored in the user recognizing unit 314 to recognize the user recognition signal. For example, when the user recognition signal is a frequency signal unique to a specific user, the frequency signal can be matched with the pre-stored frequency information to recognize the user. Further, when the user recognition signal is a code signal unique to a specific user, the code signal can be matched with the pre-stored code information to recognize the user.

Further, it needs to note that, since a complete user recognition signal needs to be transmitted in the second time period in the preset cycle, the frequency of the user recognition signal needs to be higher than the frequency corresponding to the preset cycle of the driving signal. For example, the frequency of the user recognition signal may between several MHz and several hundreds of MHz. Here, as long as the complete user recognition signal can be transmitted in the second time period in the preset cycle, the frequency of the user recognition signal is not limited. For example, in a case that the frequency corresponding to the preset cycle of the driving signal is several KHz, the frequency of the user recognition signal may be several tens of KHz.

With the above-described configuration, the user of the electronic apparatus can be recognized based on the user recognition signal applied to the touch panel 310 without influencing the touch function of the electronic apparatus, thus, a customized service or processing can be provided based on the recognized user, so as to improve ease of use and feeling of use of the electronic apparatus considerably. Further, since the present invention hardly has any modification to elements of the touch screen or the touch panel of the electronic apparatus, a function of user recognition of the electronic apparatus is implemented without increasing the complexity of the design of the electronic apparatus.

Figure 8:
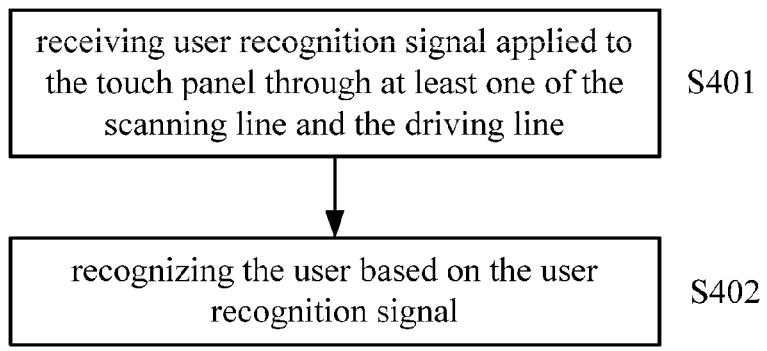
FIG. 8 is a flow chart illustrating the user recognizing method according to the fifth embodiment of the present invention.

Hereinafter, the user recognizing method according to the fifth embodiment of the present invention is described with reference to FIG. 8. FIG. 8 is a flow chart illustrating the user recognizing method according to the fifth embodiment of the present invention. According to the fifth embodiment of the present invention, the method in FIG. 8 can be applied to the electronic apparatus shown in FIG. 5 or FIG. 6. The electronic apparatus includes a touch panel on which a scanning electrode array and a driving electrode array are provided, a scanning line that is connected with the scanning electrode array and transmits a sensing signal (changed by touch of the user, hereinafter referred to as first sensing signal) from the scanning electrode array, a driving line that is connected with the driving electrode array and transmits the driving signal to the driving electrode array, a driving/scanning unit that is connected to the scanning line and the driving line and receives the sensing signal from the scanning line and provides the driving signal to the driving line, and a user recognizing unit connected with at least one of the scanning line and the driving line.

As shown in FIG. 8, in step S401, the user recognition signal applied to the touch panel is received through at least one of the scanning line and the driving line. Here, as the description before, the user recognition signal is generated by the user recognition signal generating apparatus and is applied to the wearer of the user recognition signal generating apparatus (the user of the electronic apparatus), and the user recognition signal is applied to the touch panel when finger/palm of the wearers with the touch panel. At this time, the sensing signal corresponding to the user recognition signal (generated by the user recognition signal, and hereinafter referred to as second sensing signal) is generated on the scanning electrode array and the driving electrode array on the touch panel.

For example, according to the third embodiment of the present invention, the user recognition signal applied to the touch panel can be received from the scanning line 311 through the switch unit 315. In particular, the switch unit 315 is connected with the driving/scanning unit 313, the scanning line 311 and the user recognizing unit 314 respectively, and can control the connection/disconnection of the driving/scanning unit 313 and the user recognizing unit 314 with the scanning line 311 based on the control signal. The control signal provided to the switch unit 315 can be configured, so that the switch unit 315 connects the driving/scanning unit 313 and the scanning line 311 and disconnects the user recognizing unit 314 and the scanning line 311 in a first time period in the preset circle. Further, the control signal can be configured, so that the switch unit 315 connects the user recognizing unit 314 and the scanning line 311 and disconnects the driving/scanning unit 313 and the scanning line 311 in a second time period in the preset circle. Here, the preset circle corresponds to the frequency of receiving the first sensing signal (changed by the touch of the user) from the scanning line by the driving/scanning unit 313. For example, the first time period in the preset circle can correspond to a circle of high level of the first sensing signal, and the second time period in the preset circle can correspond to a circle of low level of the first sensing signal. In this case, in the first time period in the preset cycle, the driving/scanning unit 313 is connected with the scanning line 311 and can receive the first sensing signal from the scanning line 311. In addition, in the second time period in the preset cycle, the user recognizing unit 314 is connected with the scanning line 311, and can receive the second sensing signal from the scanning line 311. Therefore, the user recognizing unit 314 can obtain the second sensing signal corresponding to the user recognition signal.

Further, according to the fourth embodiment of the present invention, the user recognition signal applied to the touch panel can be received from the driving line 312 through the switch unit 325. In particular, the switch unit 325 is connected with the driving/scanning unit 313, the driving line 312 and the user recognizing unit 314 respectively. Moreover, the control signal provided to the switch unit 325 can be configured, so that the switch unit 325 connects the driving/scanning unit 313 and the driving line 312 and disconnects the user recognizing unit 314 and the driving line 312 in the first time period in the preset cycle. Further, the control signal can be configured, so that the switch unit 325 connects the user recognizing unit 314 and the driving line 312 and disconnects the driving/scanning unit 313 and the driving line 312 in a second time period in the preset circle. Here, the preset cycle corresponds to the frequency of transmitting the driving signal to the driving line 312 by the driving/scanning unit 313. For example, the first time period in the preset circle can correspond to a circle of high level of the driving signal, and the second time period in the preset circle can correspond to a circle of low level of the driving signal. In this case, in the first time period in the preset cycle, the driving/scanning unit 313 is connected with the driving line 312 and can transmit the driving signal to the driving line 312. In addition, in the second time period in the preset cycle, the user recognizing unit 314 is connected with the driving line and can receive the second sensing signal from the driving line 312. In this case, the user recognizing unit 14 can obtain the second sensing signal corresponding to the user recognition signal, so as to recognize the wearer wearing the user recognition signal generating apparatus.

Then, in step s402, the user is recognized based on the user recognition signal.

In particular, user recognition information can be pre-stored in the user recognizing unit 314 to recognize the user recognition signal. For example, when the user recognition signal is a frequency signal unique to a specific user, a plurality of frequency information can be set in the user recognizing unit 314, and the frequency signal is matched with the pre-stored frequency information to recognize the user. Further, when the user recognition signal is a code signal unique to a specific user, a plurality of code information can be set in the user recognizing unit 314, and the code signal is matched with the pre-stored code information to recognize the user.

Here, those skilled in the art can understand that, the electronic apparatus and data transmission method according to the first embodiment and the second embodiment of the present invention as well as the electronic apparatus and the user recognizing method according to the third embodiment to the fifth embodiment of the present invention can be used in combination with each other or used individually. For example, when the electronic apparatus and data transmission method according to the first embodiment and the second embodiment of the present invention as well as the electronic apparatus and the user recognizing method according to the third embodiment to the fifth embodiment of the present invention are used in combination with each other, the touch control communication unit in the electronic apparatus and data transmission method according to the first embodiment and the second embodiment of the present invention may be the touch panel in the electronic apparatus and the user recognizing method according to the third embodiment to the fifth embodiment of the present invention on which a scanning electrode array and a driving electrode array are provided. In addition, the touch control driving unit in the electronic apparatus and data transmission method according to the first embodiment and the second embodiment of the present invention can be the driving/scanning unit in the electronic apparatus and the user recognizing method according to the third embodiment to the fifth embodiment of the present invention.

When the electronic apparatus and data transmission method according to the first embodiment and the second embodiment of the present invention are used individually, the electronic apparatus and data transmission method according to the embodiments of the present invention can be configured as follows.

(1) An electronic apparatus, comprising:

A touch control communication unit for executing touch control input or communication data transmission;

A touch control driving unit for providing a driving signal to the touch control communication unit and receiving a touch control signal from the touch control communication unit;

A communication driving unit for providing communication data to be transmitted to the touch control communication unit and receiving communication data from the touch control communication unit; and A control unit for controlling the touch control communication unit to be in a first working status or a second working status according to predetermined conditions, Wherein, in the first working status, the touch control communication unit is electrically connected to the touch control driving unit and the touch control communication unit executes the touch control input, and in the second working status, the touch control communication unit is electrically connected to the communication driving unit and the touch control communication unit executes the communication data transmission.

(2) The electronic apparatus according to the above (1), wherein the touch control communication unit includes a baseboard and an electrode array arranged on the baseboard.

(3) The electronic apparatus according to the above (2), wherein the electrode array includes a scanning electrode array and a driving electrode array, and the communication driving unit includes a communication data receiving unit and a communication data transmitting unit;

The scanning electrode array is connected to the touch control driving unit via a scanning line to provide a touch control signal obtained by scanning by the scanning electrode array to the touch control driving unit, and the scanning electrode array is connected to the communication data receiving unit via a data receiving transmission line to provide communication data received by the scanning electrode array to the communication driving unit;

The driving electrode array is connected to the touch control driving unit via a driving line to receive the driving signal provided by the touch control driving unit, and the driving electrode array is connected to the communication data transmitting unit via a data transmitting transmission line to receive communication data provided by the communication data transmitting unit.

(4) The electronic apparatus according to the above (2), further including a first switch unit and a second switch unit, Wherein, the first switch unit is placed between the scanning electrode array and the touch control driving unit and the communication data receiving unit, and is for making the scanning electrode array be electrically connected with the touch control driving unit or making the scanning electrode array be electrically connected with the communication data receiving unit according to a control signal from a control unit;

The second switch unit is placed between the driving electrode array and the touch control driving unit and the communication data transmitting unit, and is for making the driving electrode array be electrically connected with the touch control driving unit or making the driving electrode array be electrically connected with the communication data transmitting unit according to the control signal from control unit;

(5) The electronic apparatus according to any one of the above (1) to (4), wherein the communication data is a communication data for a body area network.

(6) The electronic apparatus according to the above (5), wherein the communication data conforms to specification of IEEE 802.15.6.

(7) The electronic apparatus according to the above (5), wherein the communication driving unit further includes a modulating and demodulating unit for modulating the communication data transmitted into communication data for the body area network and demodulating the communication data received into data to be processed by the electronic apparatus.

(8) A data transmission method applied in an electronic apparatus that includes a touch control communication unit for executing touch control input or communication data transmission, a touch control driving unit for providing a driving signal to the touch control communication unit and receiving a touch control signal from the touch control communication unit, a communication driving unit for providing communication data to be transmitted to the touch control communication unit and receiving communication data from the touch control communication unit, and a control unit for controlling the touch control communication unit to be in a first working status or a second working status according to predetermined conditions, the data transmission method including:

Receiving, by the control unit, a working status instruction;

Deciding that, by the control unit, the working status instruction indicates that the touch control communication unit is in the first working status or the second working status based on the working status instruction received;

If the working status instruction indicates that the touch control communication unit is in the first working status, the control unit controlling the touch control communication unit to be electrically connected with the touch control driving unit and the touch control communication unit executing the touch control input; and If the working status instruction indicates that the touch control communication unit is in the second working status, the control unit controlling the touch control communication unit to be electrically connected with the communication driving unit and the touch control communication unit executing the communication data transmission.

(9) The data transmission method according to the above (8), wherein the touch control communication unit includes a baseboard and an electrode array arranged on the baseboard.

(10) The data transmission method according to the above (9), wherein the electrode array includes a scanning electrode array and a driving electrode array, and the communication driving unit includes a communication data receiving unit and a communication data transmitting unit, and the control unit controlling the touch control communication unit to be electrically connected with the touch control driving unit specifically includes:

The control unit controlling the scanning electrode array to be connected to the touch control driving unit via a scanning line to provide the touch control signal obtained by scanning by the scanning electrode array to the touch control driving unit, and controlling the driving electrode array to be connected to the touch control driving unit via a driving line to receive a driving signal provided by the touch control driving unit.

(11) The data transmission method according to the above (10), wherein the control unit controlling the touch control communication unit to be electrically connected with the communication driving unit specifically includes:

The control unit controlling the scanning electrode array to be connected to the communication data receiving unit via a data receiving transmission line to provide communication data received by the scanning electrode array to the communication driving unit, and controlling the driving electrode array to be connected to the communication data transmitting unit via a data transmitting transmission line to receive communication data provided by the communication data transmitting unit.

(12) The data transmission method according to the above (10), wherein the electronic apparatus further includes a first switch unit and a second switch unit, the first switch unit is placed between the scanning electrode array and the touch control driving unit and the communication data receiving unit, the second switch unit is placed between the driving electrode array and the touch control driving unit and the communication data transmitting unit, and, the control unit controlling the touch control communication unit to be electrically connected with the touch control driving unit specifically includes:

The control unit controlling the first switch unit to connect the scanning electrode array and the touch control driving unit, and controlling the second switch unit to connect the driving electrode array and the touch control driving unit.

(13) The data transmission method according to the above (10), wherein the control unit controlling the touch control communication unit to be electrically connected with the communication driving unit specifically includes:

The control unit controlling the first switch unit to connect the scanning electrode array and the communication data receiving unit, and controlling the second switch unit to connect the driving electrode array and the communication data transmitting unit.

(14) The data transmission method according to any one of the above (8) to (13), wherein the communication data is a communication data for a body area network.

(15) The data transmission method according to the above (14), wherein the communication data conforms to specification of IEEE 802.15.6.

(16) The data transmission method according to the above (15), wherein the communication driving unit further includes a modulating and demodulating unit for modulating the communication data transmitted into communication data for the body area network and demodulating the communication data received into data to be processed by the data transmission method.

When the electronic apparatus and data transmission method according to the first embodiment and the second embodiment of the present invention as well as the electronic apparatus and the user recognizing method according to the third embodiment to the fifth embodiment of the present invention are used in combination with each other, the electronic apparatus and data transmission method according to the embodiments of the present invention can be configured as follows.

(17) The electronic apparatus according to any one of the above (1) to (7), wherein:

The touch control communication unit has provided a scanning electrode array and a driving electrode array thereon;

The electronic apparatus further includes:

A scanning line configured to be connected with the scanning electrode array and transmit a sensing signal from the scanning electrode array;

A driving line configured to be connected with the driving electrode array and transmit a driving signal to the driving electrode array; and A user recognizing unit configured to be connected with at least one of the scanning line and the driving line and receive a user recognition signal applied to the touch panel through at least one of the scanning line and the driving line to recognize the user;

Wherein, the touch control driving unit is connected with the scanning line and the driving line and configured to receive a sensing signal from the scanning line and provide a driving signal to the driving line.

(18) The electronic apparatus according to the above (17), wherein:

The user recognition signal is generated by a user recognition signal generating apparatus.

(19) The electronic apparatus according to the above (18), wherein the user recognition signal generating apparatus further includes:

A user recognition signal generating unit configured to generate the user recognition signal corresponding to the wearer of the user recognition signal generating apparatus; and A first interface configured to contact with the wearer and transmit the user recognition signal to the wearer.

(20) The electronic apparatus according to the above (19), wherein:

The user recognition signal is applied to the touch panel when the finger/palm of the wearer contacts with the touch panel.

(21) The electronic apparatus according to the above (17), wherein:

The user recognizing unit is connected with the scanning line; and

The electronic apparatus further includes:

A third switch unit that is connected with the touch control driving unit, the scanning line and the user recognizing unit respectively and controls connection/disconnection of the touch control driving unit and the user recognizing unit with the scanning line, Wherein, the third switch unit connects the touch control driving unit and the scanning line and disconnects the user recognizing unit and the scanning line in a first time period in a first circle; and The third switch unit connects the user recognizing unit and the scanning line and disconnects the touch control driving unit and the scanning line in a second time period in the first circle.

(22) The electronic apparatus according to the above (17), wherein:

The user recognizing unit is connected with the driving line; and

The electronic apparatus further includes:

A fourth switch unit that is connected with the touch control driving unit, the driving line and the user recognizing unit respectively and controls connection/disconnection of the touch control driving unit and the user recognizing unit with the driving line, Wherein, the fourth switch unit connects the touch control driving unit and the driving line and disconnects the user recognizing unit and the driving line in the first time period in the first circle; and The third switch unit connects the user recognizing unit and the driving line and disconnects the touch control driving unit and the driving line in the second time period in the first circle.

(23) The electronic apparatus according to the above (21) or (22), wherein

The first circle corresponds to a frequency of receiving the sensing signal from the scanning line or a frequency of providing the driving signal to the driving line by the touch control driving unit.

(24) The electronic apparatus according to the above (23), wherein:

The frequency of the user recognition signal is higher than the frequency corresponding to the first circle; and The frequency of the user recognition signal represents the wearer of the user recognition signal generating apparatus.

(25) The data transmission method according to any one of the above (8) to (16), wherein:

The touch control communication unit has provided a scanning electrode array and a driving electrode array thereon;

The electronic apparatus further includes:

A scanning line configured to be connected with the scanning electrode array and transmit a sensing signal from the scanning electrode array;

A driving line configured to be connected with the driving electrode array and transmit a driving signal to the driving electrode array; and A user recognizing unit connected with at least one of the scanning line and the driving line and configured to receive a sensing signal from the scanning line and provide a driving signal to the driving line, Wherein, the touch control driving unit is connected with the scanning line and the driving line, The data transmission method further includes:

Receiving a user recognition signal applied to the touch control communication unit through at least one of the scanning line and the driving line; and Recognizing the user based on the user recognition signal.

(26) The data transmission method according to the above (25), wherein:

The user recognition signal is generated by a user recognition signal generating apparatus and applied to the wearer of the user recognition signal generating apparatus; and The user recognition signal is applied to the touch control communication unit when the finger/palm of the wearer contacts with touch control communication unit.

When the electronic apparatus and the user recognizing method according to the third embodiment to the fifth embodiment of the present invention are used individually, the electronic apparatus and the user recognizing method according to the embodiments of the present invention can be configured as follows.

(27) An electronic apparatus, comprising:

A touch panel on which a scanning electrode array and a driving electrode array are provided;

A scanning line configured to be connected with the scanning electrode array and transmit a sensing signal from the scanning electrode array;

A driving line configured to be connected with the driving electrode array and transmit a driving signal to the driving electrode array;

A driving/scanning unit connected with the scanning line and the driving line and configured to receive a sensing signal from the scanning line and provide a driving signal to the driving line;

A user recognizing unit configured to be connected with at least one of the scanning line and the driving line and receive a user recognition signal applied to the touch panel through at least one of the scanning line and the driving line to recognize the user.

(28) The electronic apparatus according to the above (27), wherein:

The user recognition signal is generated by a user recognition signal generating apparatus.

(29) The electronic apparatus according to the above (28), wherein the user recognition signal generating apparatus further includes:

A user recognition signal generating unit configured to generate the user recognition signal corresponding to the wearer of the user recognition signal generating apparatus; and A first interface configured to contact with the wearer and transmit the user recognition signal to the wearer.

(30) The electronic apparatus according to the above (29), wherein:

The user recognition signal is applied to the touch panel when the finger/palm of the wearer contacts with the touch panel.

(31) The electronic apparatus according to the above (27), wherein:

The user recognizing unit is connected with the scanning line; and

The electronic apparatus further includes:

A first switch that is connected with the driving/scanning unit, the scanning line and the user recognizing unit respectively and controls connection/disconnection of the driving/scanning unit and the user recognizing unit with the scanning line, Wherein, the first switch connects the driving/scanning unit and the scanning line and disconnects the user recognizing unit and the scanning line in a first time period in a first circle; and The first switch connects the user recognizing unit and the scanning line and disconnects the driving/scanning unit and the scanning line in a second time period in the first circle.

(32) The electronic apparatus according to the above (27), wherein:

The user recognizing unit is connected with the driving line; and

The electronic apparatus further includes:

A second switch connected with the driving/scanning unit, the driving line and the user recognizing unit respectively and configured to control connection/disconnection of the driving/scanning unit and the user recognizing unit with the driving line, Wherein, the second switch connects the driving/scanning unit and the driving line and disconnects the user recognizing unit and the driving line in a first time period in a first circle; and The second switch connects the user recognizing unit and the driving line and disconnects the driving/scanning unit and the driving line in the second time period in the first circle.

(33) The electronic apparatus according to the above (31) or (32), wherein:

The first circle corresponds to a frequency of receiving the sensing signal from the scanning line or a frequency of providing the driving signal to the driving line by the driving/scanning unit.

(34) The electronic apparatus according to the above (33), wherein:

The frequency of the user recognition signal is higher than the frequency corresponding to the first circle; and The frequency of the user recognition signal represents the wearer of the user recognition signal generating apparatus.

(35) A user recognizing method applied in an electronic apparatus that includes a touch panel on which a scanning electrode array and a driving electrode array are provided, a scanning line that is connected with the scanning electrode array and transmits a sensing signal from the scanning electrode array, a driving line that is connected with the driving electrode array and transmits a driving signal to the driving electrode array, a driving/scanning unit connected with the scanning line and the driving line and configured to receive a sensing signal from the scanning line and provide a driving signal to the driving line, and a user recognizing unit connected with at least one of the scanning line and the driving line, the user recognizing method including:

Receiving a user recognition signal applied to the touch panel through at least one of the scanning line and the driving line; and Recognizing the user based on the user recognition signal.

(36) The user recognizing method according to the above (35), wherein:

The user recognition signal is generated by a user recognition signal generating apparatus and applied to the wearer of the user recognition signal generating apparatus; and The user recognition signal is applied to the touch panel when the finger/palm of the wearer contacts with the touch panel.

And, those skilled in the art can understand, the above-described (17) to (26) is described for the electronic apparatus and data transmission method according to the embodiments of the present invention by incorporating the technical features of the electronic apparatus and the user recognizing method according to the third embodiment to the fifth embodiment of the present invention into the technical solution of the electronic apparatus and data transmission method according to the first embodiment and the second embodiment of the present invention. Further, when the electronic apparatus and data transmission method according to the first embodiment and the second embodiment of the present invention as well as the electronic apparatus and the user recognizing method according to the third embodiment to the fifth embodiment of the present invention are used in combination with each other, the technical features of the electronic apparatus and data transmission method according to the first embodiment and the second embodiment of the present invention can be incorporated into the technical solution of the electronic apparatus and the user recognizing method according to the third embodiment to the electronic apparatus of the present invention similarly. In this case, the electronic apparatus and the user recognizing method according to the embodiments of the present invention are configured as follows.

(37) The electronic apparatus according to any one of the above (27) to (34), wherein:

The touch panel is for executing touch control input or communication data transmission, The driving/scanning unit is for providing a driving signal to the touch panel and receiving a touch control signal from the touch panel;

The electronic apparatus further includes:

A communication driving unit for providing communication data to be transmitted to the touch panel and receiving communication data from the touch panel; and A control unit for controlling the touch panel to be in a first working status or a second working status according to predetermined conditions, Wherein, in the first working status, the touch panel is electrically connected to the driving/scanning unit and the touch panel executes the touch control input, and in the second working status, the touch panel is electrically connected to the communication driving unit and the touch panel executes the communication data transmission.

(38) The electronic apparatus according to the above (37), wherein the touch panel includes a baseboard and an electrode array arranged on the baseboard.

(39) The electronic apparatus according to the above (38), wherein the electrode array includes a scanning electrode array and a driving electrode array, and the communication driving unit includes a communication data receiving unit and a communication data transmitting unit;

The scanning electrode array is connected to the driving/scanning unit via a scanning line to provide a touch control signal obtained by scanning by the scanning electrode array to the driving/scanning unit, and the scanning electrode array is connected to the communication data receiving unit via a data receiving transmission line to provide communication data received by the scanning electrode array to the communication driving unit;

The driving electrode array is connected to the driving/scanning unit via a driving line to receive the driving signal provided by the driving/scanning unit, and the driving electrode array is connected to the communication data transmitting unit via a data transmitting transmission line to receive communication data provided by the communication data transmitting unit.

(40) The electronic apparatus according to the above (38), further including a third switch and a fourth switch, Wherein, the third switch is placed between the scanning electrode array and the driving/scanning unit and the communication data receiving unit, and is for making the scanning electrode array be electrically connected with the driving/scanning unit or making the scanning electrode array be electrically connected with the communication data receiving unit according to a control signal from the control unit;

The fourth switch is placed between the driving electrode array and the driving/scanning unit and the communication data transmitting unit, and is for making the driving electrode array be electrically connected with the driving/scanning unit or making the driving electrode array be electrically connected with the communication data transmitting unit according to a control signal from the control unit.

(41) The electronic apparatus according to any one of the above (37) to (40), wherein the communication data is a communication data for a body area network.

(42) The electronic apparatus according to the above (41), wherein the communication data conforms to specification of IEEE 802.15.6.

(43) The electronic apparatus according to the above (41), wherein the communication driving unit further includes a modulating and demodulating unit for modulating the communication data transmitted into communication data for the body area network and demodulating the communication data received into data to be processed by the electronic apparatus.

(44) The user recognizing method according to the above (35) or (36), is the method being applied in an electronic apparatus, Wherein, the touch panel is for executing touch control input or communication data transmission, The driving/scanning unit is for providing a driving signal to the touch panel and receiving a touch control signal from the touch panel;

The electronic apparatus further includes:

A communication driving unit for providing communication data to be transmitted to communication driving unit and receiving communication data from the communication driving unit; and A control unit for controlling the touch panel to be in a first working status or a second working status according to predetermined conditions, The user recognizing method further includes:

Receiving, by the control unit, a working status instruction;

Deciding that, by the control unit, the working status instruction indicates that the touch panel is in the first working status or the second working status based on the working status instruction received;

If the working status instruction indicates that the touch panel is in the first working status, the control unit controlling the touch panel to be electrically connected with the driving/ scanning unit and the touch panel executing the touch control input; and If the working status instruction indicates that the touch panel is in the second working status, the control unit controlling the touch panel to be electrically connected with the communication driving unit and the touch panel executing the communication data transmission.

(45) The user recognizing method according to the above (44), wherein the touch panel includes a baseboard and an electrode array arranged on the baseboard.

(46) The user recognizing method according to the above (45), wherein the electrode array includes a scanning electrode array and a driving electrode array, and the communication driving unit includes a communication data receiving unit and a communication data transmitting unit, and the control unit controlling the touch panel to be electrically connected with the driving/scanning unit specifically includes:

The control unit controlling the scanning electrode array to be connected to the driving/scanning unit via a scanning line to provide the touch control signal obtained by scanning by the scanning electrode array to the driving/scanning unit, and controlling the driving electrode array to be connected to the driving/scanning unit via a driving line to receive a driving signal provided by the driving/scanning unit.

(47) The user recognizing method according to the above (46), wherein the control unit controlling the touch panel to be electrically connected with the communication driving unit specifically includes:

The control unit controlling the scanning electrode array to be connected to the communication data receiving unit via a data receiving transmission line to provide communication data received by the scanning electrode array to the communication driving unit, and controlling the driving electrode array to be connected to the communication data transmitting unit via a data transmitting transmission line to receive communication data provided by the communication data transmitting unit.

(48) The user recognizing method according to the above (46), wherein the electronic apparatus further includes a third switch and a fourth switch, the third switch is placed between the scanning electrode array and the driving/scanning unit and the communication data receiving unit, the fourth switch is placed between the driving electrode array and the driving/scanning unit and the communication data transmitting unit, and, the control unit controlling the touch panel to be electrically connected with the driving/scanning unit specifically includes:

The control unit controlling the third switch to connect the scanning electrode array and the driving/scanning unit, and controlling the fourth switch to connect the driving electrode array and the driving/scanning unit.

(49) The user recognizing method according to the above (46), wherein the control unit controlling the touch panel to be electrically connected with the communication driving unit specifically includes:

The control unit controlling the third switch to connect the scanning electrode array and the communication data receiving unit, and controlling the fourth switch to connect the driving electrode array and the communication data receiving unit.

(50) The user recognizing method according to any one of the above (44) to (49), wherein the communication data is a communication data for a body area network.

(51) The user recognizing method according to the above (50), wherein the communication data conforms to specification of IEEE 802.15.6.

(52) The user recognizing method according to the above (51), wherein the communication driving unit further includes a modulating and demodulating unit for modulating the communication data transmitted into communication data for the body area network and demodulating the communication data received into data to be processed by the electronic apparatus.

Here, those skilled in the art can understand that, the electronic apparatus and data transmission method according to the first embodiment and the second embodiment of the present invention as well as the electronic apparatus and the user recognizing method according to the third embodiment to the fifth embodiment of the present invention can be combined with each other in other manners, the embodiments of the present invention do not make any restriction thereto. Each embodiment of the present invention is described in detail above. However, those skilled in the art should understand, these embodiments can be made various modifications, combinations or sub-combinations without departing from the principle and spirit of the present invention, and such modification should fall into the scope of the present invention.

Those skilled in the art should understand that, the embodiments of the present invention can be provided as a method, a system or a computer program product. Therefore, the present invention can adopt forms of a full hardware embodiment, a full software embodiment, or an embodiment combining software and hardware aspects. Moreover, the present invention can adopt forms of computer program product implemented on one or more computer usable storage mediums (including, but not limited to magnetic disk storage, CD-ROM, optical memory or the like) including computer usable program codes.

The present invention is described by referring to flow charts and/or block diagrams of method, apparatus (system) and computer program product according to the embodiments of the present invention. It should be understood that each flow and/or block in the flow charts and/or block diagrams and the combination of the flow and/or block in the flow charts and/or block diagrams could be implemented by computer program instruction. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processor of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

Further, it needs to note that, in the specification, terms "comprise", "include" and any other variations thereof intend to cover nonexclusive inclusion so that the procedure, the method, the product or the equipment including a series of elements not only includes these elements, but also include other elements which are not listed explicitly, or also include inherent elements of these procedure, method, product or equipment. In a case that there is no more limitation, the element defined by statement "including one . . . " does not exclude there is an additional same element in the procedure, method, article or apparatus including the element.

Finally, it should note that, the above-described series of processing does not only comprise processing executed chronologically in the order mentioned here, and also comprise processing executed in parallel or individually but not chronologically.

Though some embodiments of the present invention are shown and described, those skilled in the art should understand, these embodiments can be carried out various modifications without departing from the principle and spirit of the present invention, and such modifications should fall into the scope of the present invention.

What is claimed is:

1. An electronic apparatus, comprising:
a touch control communication unit for executing touch control input or communication data transmission;
a touch control driving unit for providing a driving signal to the touch control communication unit and receiving a touch control signal from the touch control communication unit;
a communication driving unit for providing communication data to be transmitted to the touch control communication unit and receiving communication data from the touch control communication unit; and
a control unit for controlling the touch control communication unit to be in a first working status or a second working status according to predetermined conditions, wherein in the first working status, the touch control communication unit is electrically connected to the touch control driving unit and the touch control communication unit executes the touch control input, and in the second working status, the touch control communication unit is electrically connected to the communication driving unit and the touch panel executes the communication data transmission, and in the second working status, the touch control communication unit are able to transmit the communication data to be transmitted to another electronic apparatus via the human body contacting the touch control communication unit and receive the communication data transmitted via the human body contacting the touch control communication unit from the another electronic apparatus;
the touch control communication unit including a baseboard and an electrode array arranged on the baseboard, the electrode array includes a scanning electrode array and a driving electrode array, and the communication driving unit includes a communication data receiving unit and a communication data transmitting unit;
in the first working status, the scanning electrode array being connected to the touch control driving unit via a scanning line to provide a touch control signal obtained by scanning by the scanning electrode array to the touch control driving unit, and in the second working status the scanning electrode array being connected to the communication data receiving unit via a data receiving transmission line to provide communication data received by the scanning electrode array to the communication driving unit;
in the first working status, the driving electrode array being connected to the touch control driving unit via a driving line to receive the driving signal provided by the touch control driving unit, and in the second working status, the driving electrode array being connected to the communication data transmitting unit via a data transmitting transmission line to receive communication data provided by the communication data transmitting unit;
a first switch unit and a second switch unit, the first switch unit being placed between the scanning electrode array and the touch control driving unit and the communication data receiving unit, and for making the scanning electrode array be electrically connected with the touch control driving unit or making the scanning electrode array be electrically connected with the communication data receiving unit according to a control signal from a control unit, the second switch unit being placed between the driving electrode array and the touch control driving unit and the communication data transmitting unit, and for making the driving electrode array be electrically connected with the touch control driving unit or making the driving electrode array be electrically connected with the communication data transmitting unit according to a control signal from a control unit.

2. The electronic apparatus according to claim 1, wherein the communication data is a communication data for a body area network.

3. The electronic apparatus according to claim 2, wherein the communication data conforms to specification of IEEE 802.15.6.

4. The electronic apparatus according to claim 2, wherein the communication driving unit further includes a modulating and demodulating unit for modulating the communication data transmitted into communication data for the body area network and demodulating the communication data received into data to be processed by the electronic apparatus.

5. The electronic apparatus according to claim 1, wherein:
the touch control communication unit has provided a scanning electrode array and a driving electrode array thereon;
the electronic apparatus further includes:
a scanning line configured to be connected with the scanning electrode array and transmit a sensing signal from the scanning electrode array;
a driving line configured to be connected with the driving electrode array and transmit a driving signal to the driving electrode array; and
a user recognizing unit configured to be connected with at least one of the scanning line and the driving line and receive a user recognition signal applied to the touch panel through at least one of the scanning line and the driving line to recognize the user, and
the touch control driving unit is connected with the scanning line and the driving line and configured to receive a sensing signal from the scanning line and provide a driving signal to the driving line.

6. A data transmission method applied in an electronic apparatus that includes a touch control communication unit for executing touch control input or communication data transmission, a touch control driving unit for providing a driving signal to the touch control communication unit and receiving a touch control signal from the touch control communication unit, a communication driving unit for providing communication data to be transmitted to the touch control communication unit and receiving communication data from the touch control communication unit, and a control unit for controlling the touch control communication unit to be in a first working status or a second working status according to predetermined conditions, the data transmission method comprising:

receiving, by the control unit, a working status instruction; and deciding that, by the control unit, the working status instruction indicates that the touch control communication unit is in the first working status or the second working status based on the working status instruction received, wherein, when the working status instruction indicates that the touch control communication unit is in the first working status, the control unit controlling the touch control communication unit to be electrically connected with the touch control driving unit and the touch control communication unit executing the touch control input; and when the working status instruction indicates that the touch control communication unit is in the second working status, the control unit controlling the touch control communication unit to be electrically connected with the communication driving unit and the touch control communication unit executing the communication data transmission, and in the second working status, the touch control communication unit are able to transmit the communication data to be transmitted to another electronic apparatus via the human body contacting the touch control communication unit and receive the communication data transmitted via the human body contacting the touch control communication unit from the another electronic apparatus, wherein the touch control communication unit includes a baseboard and an electrode array arranged on the baseboard, the electrode array includes a scanning electrode array and a driving electrode array, and the communication driving unit includes a communication data receiving unit and a communication data transmitting unit, and the control unit controlling the touch control communication unit to he electrically connected with the touch control driving unit includes:

in the first working status, the control unit controlling the scanning electrode array to be connected to the touch control driving unit via a scanning line to provide the touch control signal obtained by scanning by the scanning electrode array to the touch control driving unit, and controlling the driving electrode array to he connected to the touch control driving unit via a driving line to receive a driving signal provided by the touch control driving unit; and in the second working status, the control unit controlling the scanning electrode array to be connected to the communication data receiving unit via a data receiving transmission line to provide communication data received by the scanning electrode array to the communication driving unit, and controlling the driving electrode array to be connected to the communication data transmitting unit via a data transmitting transmission line to receive communication data provided by the communication data transmitting unit;

wherein the electronic apparatus comprises a first switch unit and a second switch unit, the first switch unit is placed between the scanning electrode array and the touch control driving unit and the communication data receiving unit, the second switch unit is placed between the driving electrode array and the touch control driving unit and the communication data transmitting unit, and, the control unit controlling the touch control communication unit to be electrically connected with the touch control driving unit that includes the control unit controlling the first switch unit to connect the scanning electrode array and the touch control driving unit, and controlling the second switch unit to connect the driving electrode array and the touch control driving unit.

7. The data transmission method according to claim 6, wherein the control unit controlling the touch control communication unit to be electrically connected with the communication driving unit specifically includes:

the control unit controlling the first switch unit to connect the scanning electrode array and the communication data receiving unit, and controlling the second switch unit to connect the driving electrode array and the communication data receiving unit.

8. The data transmission method according to claim 6, wherein the communication data is a communication data for a body area network.

9. The data transmission method according to claim 8, wherein the communication data conforms to specification of IEEE 802.15.6.

10. The data transmission method according to claim 9, wherein the communication driving unit further includes a modulating and demodulating unit for modulating the communication data transmitted into communication data for the body area network and demodulating the communication data received into data to be processed by the data transmission method.

11. The data transmission method according to claim 6, wherein:

the touch control communication unit has provided a scanning electrode array and a driving electrode array thereon;

the electronic apparatus further includes:

a scanning line configured to be connected with the scanning electrode array and transmit a sensing signal from the scanning electrode array;

a driving line configured to be connected with the driving electrode array and transmit a driving signal to the driving electrode array; and a user recognizing unit connected with at least one of the scanning line and the driving line and configured to receive a sensing signal from the scanning line and provide a driving signal to the driving line, the touch control driving unit is connected with the scanning line and the driving line, and the data transmission method further includes:

receiving a user recognition signal applied to the touch control communication unit through at least one of the scanning line and the driving line; and recognizing the user based on the user recognition signal.

12. An electronic apparatus, comprising:

a touch panel on which a scanning electrode array and a driving electrode array are provided;

a scanning line configured to be connected with the scanning electrode array and transmit a sensing signal from the scanning electrode array;

a driving line configured to be connected with the driving electrode array and transmit a driving signal to the driving electrode array;

a driving/scanning unit connected with the scanning line and the driving line and configured to receive a sensing signal from the scanning line and provide a driving signal to the driving line; and a user recognizing unit configured to be connected with at least one of the scanning line and the driving line and receive a user recognition signal applied to the touch panel through at least one of the scanning line and the driving line to recognize the user, the touch panel executing touch control input or communication data transmission, the driving/scanning unit providing a driving signal to the touch panel and receiving a touch control signal from the touch panel;

a communication driving unit for providing communication data to be transmitted to the touch panel and receiving communication data from the touch panel, the communication driving unit includes a communication data receiving unit and a communication data transmitting unit;

a control unit for controlling the touch panel to be in a first working status or a second working status according to predetermined conditions, in the first working status, the touch panel is electrically connected to the driving/scanning unit and the touch panel executes the touch control input, and in the second working status, the touch panel is electrically connected to the communication driving unit and the touch panel executes the communication data transmission, and in the second working status, the touch control communication unit are able to transmit the communication data to be transmitted to another electronic apparatus via the human body contacting the touch control communication unit and receive the communication data transmitted via the human body contacting the touch control communication unit from the another electronic apparatus;

in the first working status, the scanning electrode array is connected to the driving/scanning unit via the scanning line to provide a touch control signal obtained by scanning by the scanning electrode array to the touch control driving unit, and in the second working states the scanning electrode array is connected to the communication data receiving unit via a data receiving transmission line to provide communication data received by the scanning electrode array to the communication driving unit; and in the first working status, the driving electrode array is connected to the driving/scanning unit via a driving line to receive the driving signal provided by the touch control driving unit, and in the second working status, the driving electrode array is connected to the communication data transmitting unit via a data transmitting transmission line to receive communication data provided by the communication data transmitting unit; and a first switch unit and a second switch unit, wherein the first switch unit is placed between the scanning electrode array and the touch control driving unit and the communication data receiving unit, and is for making the scanning electrode array be electrically connected with the touch control driving unit or making the scanning electrode array be electrically connected with the communication data receiving unit according to a control signal from a control unit, the second switch unit being placed between the driving electrode array and the touch control driving unit and the communication data transmitting unit, and for making the driving electrode array be electrically connected with the touch control driving unit or making the driving electrode array be electrically connected with the communication data transmitting unit according to a control signal from a control unit.

\* \* \* \* \*